Figure 3:
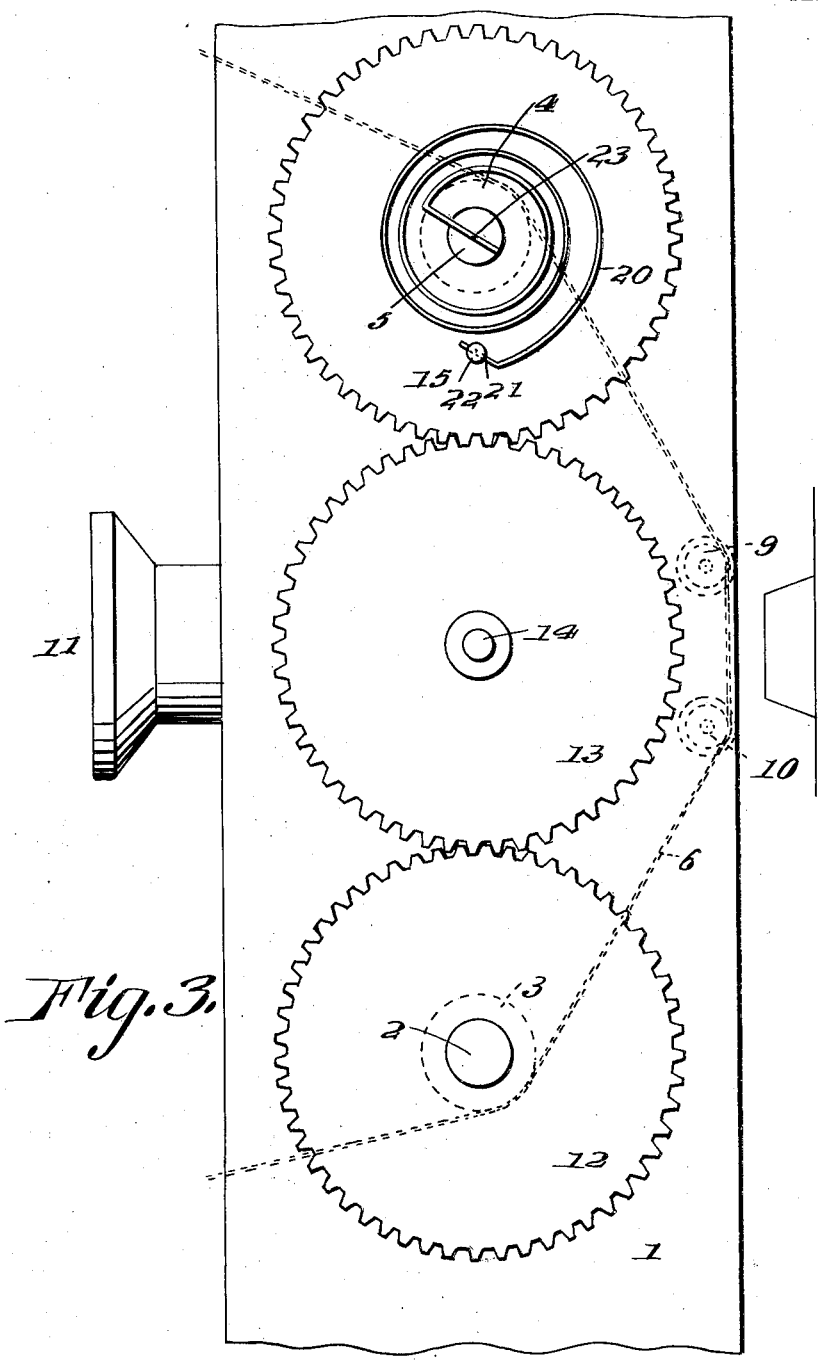

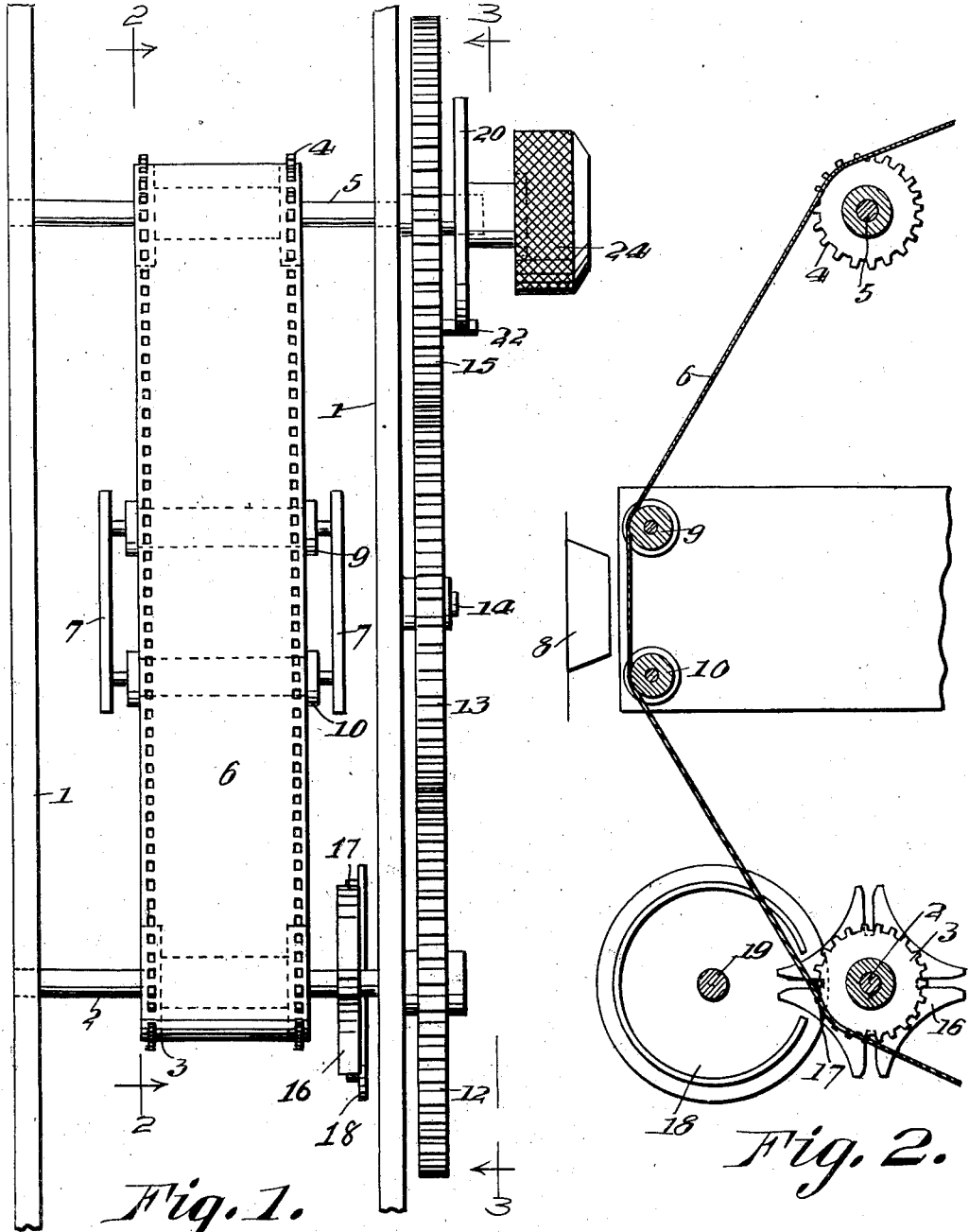

C. GREEN.
MOVING PICTURE MACHINE.
APPLICATION FILED JUNE 30, 1910.

1,057,234.

Patented Mar. 25, 1913.

2 SHEETS—SHEET 2.

Witnesses
E. B. Brown.
M. A. Bond.

Inventor
Carl Green,
B. B. Gordon
Attorney

UNITED STATES PATENT OFFICE.

CARL GREEN, OF LOGANSPORT, INDIANA.

MOVING-PICTURE MACHINE.

1,057,234.	Specification of Letters Patent.	Patented Mar. 25, 1913.

Application filed June 30, 1910. Serial No. 569,792.

*To all whom it may concern:*

Be it known that I, CARL GREEN, citizen of the United States, residing at Logansport, in the county of Cass and State of Indiana, have invented certain new and useful Improvements in Moving-Picture Machines, of which the following is a specification.

This invention relates to certain new and useful improvements in moving picture machines. It has for its objects among others to provide a moving tension or tongue device for stretching and locking the film in moving picture machines, and further providing an improved substitute for the rubber rollers which have been heretofore employed for producing the required tension on the film.

The invention has for a further object to provide a moving tension or tongue device for picture films which will replace the stationary film tensions which are now employed on machines in the market.

Still a further object of the invention is to provide a machine that will be much easier to run and which will reduce the wear and tear on the films, and at the same eliminate the jerky motion so common in most moving picture machines now in use.

Another object of the invention is to provide a mechanism for this purpose permitting of the film being run backward or forward.

It has for still a further object to provide a simple and efficient device which will not pull the film apart and which shall be practically noiseless and which presents nothing to scratch or cut the film. There is no hard pull on the film to start. This results in making the machine run easier and with less noise. My improved mechanism reduces the wear on the star wheel and on the sprockets and keeps an equal tension on the film at all times.

The improved device comprises a combination of gears and spring which permits the film to be stretched over rollers at the light opening. There is nothing stationary to tear or wear the film and everything that touches the film runs at the same speed at which the film is moved. The film is stretched between two sprocket wheels by the spring, which, in connection with the gears from one sprocket shaft to the other, serves to keep the film straight and tight when moved intermittently by the star and pin movement. The tension on the film can be made lighter or stronger by adjustment of the spring before putting it in place on the top sprocket. The tension device produces the same stretch on the film whether the latter is run fast or slow.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a face view of sufficient parts of the mechanism to illustrate the application of my present invention. Fig. 2 is a vertical section on the line 2—2 of Fig. 1, looking in the direction of the arrows. Fig. 3 is a view at right angles to Fig. 1, as upon the line 3—3 of said view, looking in the direction of the arrows.

Like numerals of reference indicate like parts throughout the different views.

It is to be understood that the parts of the moving picture apparatus not herein illustrated and those parts which are herein shown but not particularly described may be of any of the well-known or conventional forms and operate in the usual manner.

Of the parts herein illustrated, 1 designates the frame in the opposite parts of which is journaled the shaft 2 carrying the sprocket 3, over which and a sprocket wheel 4 on the shaft 5 also journaled in the side portions of the frame, the film 6 passes.

7 is a roller frame disposed opposite the light openings 8 and carrying the rollers 9 and 10, over which the said film passes, whereby the film is brought in proper alinement with the light opening.

11 is the lens of the apparatus disposed in the usual manner and adapted for coöperation in the manner well known in this class of devices, it being understood that no claim is herein made to any particular construction of the moving picture apparatus *per se.*

On the shaft 2 is a gear 12 which meshes with a gear 13 on a shaft 14, which gear 13, in turn, meshes with a gear 15 on the shaft 5. These gears which intermesh with each other are disposed outside of the frame 1, as seen in Figs. 1 and 3.

16, 17, 18 and 19 represent the usual star and pin movement, the star wheel 16 being mounted on the shaft 2, as clearly illustrated in Fig. 2, on which shaft is the sprocket wheel 3 over which the film passes. These parts being of the usual and well-known construction and operating in the usual manner, do not require any further description here.

The gear 15 is pivotally connected to its shaft 5, while the sprocket 4 is permanently connected thereto. The gear 15 is provided with a laterally projecting pin 22 with which is connected in any suitable manner one end 21 of a spring 20, the other end 23 of which is suitably secured in the end of the shaft 5. 24 is a thumb piece for turning the shaft.

If the shaft 5 be turned until there is tension in the spring 20 which then tends to coil up, then the film 6 can be placed or threaded on both sprocket wheels 3 and 4. This action will place the film in tension and there will always be a strong tension. The film will be straight and there will be no jerking or wear or tear of the film. The film when thus under tension will flatten itself on the rollers 9 and 10, thereby aiding in making the views straight. The rollers 9 and 10 will travel in unison with the film and the sprocket wheels, thereby providing a moving tension which obviates the wear and tear incident to stationary tensions.

The rollers 9 and 10, the light opening and the roller frame 7 are not connected to the frame 1 but to the main frame of the head which is not shown.

The thumb piece or knob 24 is omitted from Fig. 3 in order to better disclose the spring 20 and the manner of connecting its ends.

Modifications in details may be resorted to without departing from the spirit of the invention or sacrificing any of its advantages.

What is claimed as new is:—

1. In a moving picture machine, the combination with the upper and lower intermittently movable film-engaging sprockets and their shafts, said sprockets being fast upon their shafts, of gearing connecting said shafts for intermittently moving the film, one of the gears being loose upon its shaft, and a moving torque device for said film movable with said loose gear and constructed to be put under tension to normally keep the film stretched.

2. In a moving picture machine, the combination with the upper and lower intermittently movable film-engaging sprockets and their shafts, said sprockets being fast upon their shafts, of gearing connecting said shafts for intermittently moving the film, one of the gears being loose upon its shaft, a moving torque device for said film movable with said loose gear and constructed to be put under tension to normally keep the film stretched, and rollers mounted to travel in unison with the film and sprockets.

3. In a moving picture machine, the combination with the upper and lower intermittently movable film-engaging sprockets and their shafts, said sprockets being fast upon their shafts, of gearing between said shafts, one of the gears being loose upon the shaft of one of the sprockets, and a spring member connected with said loose gear and its shaft and arranged to hold the tension of the film the same at all times.

4. In a moving picture machine, the combination with the upper and lower intermittently movable film-engaging sprockets and their shafts, said sprockets being fast upon their shafts, of gearing between said shafts, one of the gears being loose upon the shaft of one of the sprockets, and a spring member connected with said loose gear and its shaft and arranged to hold the tension of the film the same at all times and mounted for actuation only at such times as the mechanism moves one picture away from the axis of the lens and another one into place.

5. In a moving picture machine, the combination with the upper and lower intermittently movable film engaging sprockets and their shafts, said sprockets being fast upon their shafts, of gearing connecting said shafts, one of the gears being loose upon the sprocket shaft, a lateral projection from said loose gear, a spring connected with the shaft of said gear and with said projection for holding the tension of the film the same at all times, and means engageable with the shaft carrying the spring for adjusting the tension of the latter.

In testimony whereof I affix my signature in presence of two witnesses.

CARL GREEN.

Witnesses:
 JOHN P. HETHERINGTON,
 PAUL R. GORDON.